(12) United States Patent
Smith et al.

(10) Patent No.: US 11,727,299 B2
(45) Date of Patent: *Aug. 15, 2023

(54) DISTRIBUTED QUANTUM COMPUTING SYSTEM

(71) Applicant: Rigetti & Co, LLC, Berkeley, CA (US)

(72) Inventors: Robert Stanley Smith, Emeryville, CA (US); William J. Zeng, Berkeley, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,290

(22) Filed: Apr. 12, 2021

(65) Prior Publication Data

US 2021/0406752 A1    Dec. 30, 2021

Related U.S. Application Data

(63) Continuation of application No. 16/012,586, filed on Jun. 19, 2018, now Pat. No. 10,977,570.

(Continued)

(51) Int. Cl.
*G06N 10/00* (2022.01)
*G06F 9/50* (2006.01)
(Continued)

(52) U.S. Cl.
CPC ........... *G06N 10/00* (2019.01); *G06F 9/3877* (2013.01); *G06F 9/4881* (2013.01);
(Continued)

(58) Field of Classification Search
None
See application file for complete search history.

(56) References Cited

U.S. PATENT DOCUMENTS 8,175,995 B2    5/2012  Amin
8,832,165 B2    9/2014  Allen et al.
(Continued)

FOREIGN PATENT DOCUMENTS

CN    104880476    9/2015
CN    105164705    12/2015
(Continued)

OTHER PUBLICATIONS

EPO, Extended European Search Report dated Apr. 20, 2021, in EP 18763996.8, 11 pgs.

(Continued)

*Primary Examiner* — Hiren P Patel
(74) *Attorney, Agent, or Firm* — Henry Patent Law Firm PLLC

(57) ABSTRACT

In a general aspect, user requests for access distributed quantum computing resources in a distributed quantum computing system are managed. In a general aspect, a job request for accessing a quantum computing resource is received. The job request includes a user id and a program. On authentication of a user associated with the job request, a job identifier is assigned to the job request, and a particular quantum computing resource is selected for the job request. The job request is individualized based on user permissions and pushed onto a queue to be processed for execution by the quantum computing resource.

20 Claims, 6 Drawing Sheets

Related U.S. Application Data

(60) Provisional application No. 62/522,537, filed on Jun. 20, 2017, provisional application No. 62/522,039, filed on Jun. 19, 2017.

(51) Int. Cl.
  *G06F 9/54* (2006.01)
  *G06F 9/38* (2018.01)
  *G06F 9/48* (2006.01)
  *G06F 9/455* (2018.01)
  *G06F 8/41* (2018.01)

(52) U.S. Cl.
  CPC ............ *G06F 9/5027* (2013.01); *G06F 9/546* (2013.01); *G06F 8/41* (2013.01); *G06F 9/455* (2013.01)

(56) References Cited

U.S. PATENT DOCUMENTS

| | | |
|---|---|---|
| 9,430,264 B2 | 8/2016 | Tang et al. |
| 9,537,953 B1* | 1/2017 | Dadashikelayeh ...... H04L 63/20 |
| 9,660,859 B1 | 5/2017 | Dadashikelayeh et al. |
| 9,858,531 B1 | 1/2018 | Monroe et al. |
| 9,870,273 B2* | 1/2018 | Dadashikelayeh ... G06F 9/4806 |
| 10,031,887 B2* | 7/2018 | Raymond ............... G06N 10/00 |
| 10,044,638 B2* | 8/2018 | Dadashikelayeh ...... G06F 16/25 |
| 10,095,981 B1* | 10/2018 | Garrison ................ G06N 10/00 |
| 10,127,499 B1* | 11/2018 | Rigetti .................... G06N 10/00 |
| 10,223,084 B1 | 3/2019 | Dunn |
| 10,275,721 B2* | 4/2019 | Dukatz .................. G06N 20/00 |
| 10,484,479 B2 | 11/2019 | Johnson et al. |
| 10,552,755 B2* | 2/2020 | Lanting .................. G06N 10/00 |
| 10,860,759 B2* | 12/2020 | Roetteler ............... G06F 30/327 |
| 10,977,570 B2* | 4/2021 | Smith .................... G06F 9/4881 |
| 11,250,334 B2* | 2/2022 | Fano ........................ G06N 10/00 |
| 2003/0016374 A1 | 1/2003 | Christodoulou et al. |
| 2003/0111659 A1 | 6/2003 | Tzalenchuk et al. |
| 2003/0169041 A1 | 9/2003 | Coury et al. |
| 2005/0038753 A1 | 2/2005 | Yen et al. |
| 2005/0273306 A1 | 12/2005 | Hilton et al. |
| 2006/0037017 A1 | 2/2006 | Accapadi et al. |
| 2006/0101236 A1 | 5/2006 | Han |
| 2007/0094661 A1 | 4/2007 | Baird et al. |
| 2007/0162262 A1 | 7/2007 | Tucci |
| 2007/0239366 A1 | 10/2007 | Hilton et al. |
| 2007/0294070 A1 | 12/2007 | Yamashita |
| 2008/0313114 A1 | 12/2008 | Rose |
| 2008/0313430 A1 | 12/2008 | Bunyk |
| 2009/0014714 A1 | 1/2009 | Koch |
| 2009/0259905 A1 | 10/2009 | Silva et al. |
| 2010/0217850 A1 | 8/2010 | Ferris |
| 2010/0325276 A1 | 12/2010 | Aarni et al. |
| 2011/0238378 A1 | 9/2011 | Allen et al. |
| 2012/0054771 A1 | 3/2012 | Krishnamurthy et al. |
| 2012/0254586 A1 | 10/2012 | Amin et al. |
| 2012/0324196 A1 | 12/2012 | Maillet et al. |
| 2013/0239176 A1 | 9/2013 | Terris et al. |
| 2013/0311990 A1 | 11/2013 | Tang et al. |
| 2014/0025610 A1 | 1/2014 | Fox et al. |
| 2014/0063027 A1 | 3/2014 | Becker |
| 2014/0082066 A1* | 3/2014 | Inui ........................ G06F 9/4843 709/203 |
| 2014/0173150 A1 | 6/2014 | Yu |
| 2014/0229722 A1 | 8/2014 | Harris |
| 2014/0297708 A1 | 10/2014 | Svore et al. |
| 2014/0343999 A1 | 11/2014 | Kim et al. |
| 2015/0046681 A1 | 2/2015 | King |
| 2015/0089505 A1* | 3/2015 | Malaiyandisamy .. G06F 9/5072 718/101 |
| 2015/0111754 A1 | 4/2015 | Harris et al. |
| 2015/0269124 A1 | 9/2015 | Hamze et al. |
| 2015/0358022 A1 | 12/2015 | McDermott et al. |
| 2016/0182397 A1* | 6/2016 | McFarlin ............ H04L 41/5051 709/226 |
| 2016/0267032 A1 | 9/2016 | Rigetti et al. |
| 2016/0328659 A1 | 11/2016 | Mohseni et al. |
| 2017/0075734 A1 | 3/2017 | Raman |
| 2017/0177534 A1 | 6/2017 | Mohseni et al. |
| 2017/0179960 A1 | 6/2017 | Hastings et al. |
| 2017/0223094 A1* | 8/2017 | Johnson ................ G06N 10/00 |
| 2017/0223143 A1 | 8/2017 | Johnson et al. |
| 2017/0255872 A1 | 9/2017 | Hamze et al. |
| 2017/0357539 A1* | 12/2017 | Dadashikelayeh ..... H04L 63/20 |
| 2017/0357561 A1* | 12/2017 | Kelly .................. G06F 11/2247 |
| 2018/0091440 A1 | 3/2018 | Dadashikelayeh et al. |
| 2018/0113742 A1 | 4/2018 | Chung et al. |
| 2018/0129966 A1 | 5/2018 | Kliuchnikov et al. |
| 2018/0181685 A1 | 6/2018 | Roetteler et al. |
| 2018/0189653 A1 | 7/2018 | Burchard |
| 2018/0246848 A1 | 8/2018 | Douglass et al. |
| 2018/0246851 A1 | 8/2018 | Zaribafiyan et al. |
| 2018/0260245 A1 | 9/2018 | Smith |
| 2019/0049495 A1 | 2/2019 | Ofek et al. |
| 2019/0164059 A1 | 5/2019 | Denchev et al. |

FOREIGN PATENT DOCUMENTS

| | | |
|---|---|---|
| WO | 2015178992 A2 | 11/2015 |
| WO | 2016011440 | 1/2016 |
| WO | 2016029172 | 2/2016 |
| WO | 2017214293 | 12/2017 |

OTHER PUBLICATIONS

USPTO, Final Office Action dated Aug. 23, 2021, in U.S. Appl. No. 15/917,317, 43 pgs.

Whitney, Mark, et al., "Automated Generation of Layout and Control for Quantum Circuits", Apr. 2, 2007, 16 pgs.

USPTO, Non-Final Office Action dated Jun. 13, 2022, in U.S. Appl. No. 15/917,317, 41 pgs.

USPTO, Third Party Submission filed Feb. 12, 2019, in U.S. Appl. No. 16/012,586.

KIPO, International Search Report and Written Opinion dated Jul. 11, 2018, in PCT/US2018/021838, 14 pgs.

KIPO, International Search Report and Written Opinion dated Sep. 20, 2018, in PCT/US2018/038359, 14 pgs.

USPTO, Advisory Action dated Sep. 3, 2020, in U.S. Appl. No. 15/917,317, 3 pgs.

USPTO, Non-Final Office Action dated Dec. 30, 2020, in U.S. Appl. No. 15/917,317, 33 pgs.

USPTO, Final Office Action dated May 20, 2020, in U.S. Appl. No. 15/917,317, 34 pgs.

USPTO, Notice of Allowance dated Feb. 19, 2021, in U.S. Appl. No. 16/012,586, 35 pgs.

USPTO, Third Party Submission filed Oct. 23, 2018, in U.S. Appl. No. 15/917,317, 43 pgs.

USPTO, Non-Final Office Action dated Oct. 31, 2019, in U.S. Appl. No. 15/917,317, 46 pages.

USPTO, Non-Final Office Action dated Sep. 6, 2019, in U.S. Appl. No. 16/012,586, 46 pages.

USPTO, Final Office Action dated Jun. 11, 2020, in U.S. Appl. No. 16/012,586, 51 pgs.

EPO, Extended European Search Report dated Mar. 4, 2021, in EP 18820794.8, 9 pgs.

Castelvecchi, "Quantum cloud goes commercial", Nature 543, Mar. 9, 2017, 1 pg.

Fu, et al., "A Heterogeneous Quantum Computer Architecture", ACM, May 2016, 9 pgs.

Haner, et al., "A software methodology for compiling quantum programs", arXiv:1604.01401v2, May 11, 2016, 14 pgs.

Hornibrook, et al., "Cryogenic control architecture for large-scale quantum computing", Physical Review Applied 3.2, Sep. 8, 2014, 8 pgs.

Peruzzo, et al., "A variational eigenvalue solver on a quantum processor", ArXiv:1304.3061v1 [quant-ph], Apr. 10, 2013, 10 pgs.

Smith, R. S., et al., "A Practical Quantum Instruction Set Architecture", arXiv:1608.03355v2 [quant-ph], Feb. 17, 2017, 15 pages.

(56) References Cited

OTHER PUBLICATIONS

Smith, Robert S, et al., "A Practical Quantum Instruction Set Architecture", arXiv:1608.03355v1 [quant-ph], Aug. 11, 2016, 14 pages.
EPO, Communication pursuant to Art. 94(3) dated Dec. 8, 2022, in EP 18763996.8, 9 pgs.

* cited by examiner

DISTRIBUTED QUANTUM COMPUTING SYSTEM

CROSS-REFERENCE TO RELATED APPLICATIONS

This application is a continuation of U.S. application Ser. No. 16/012,586, filed Jun. 19, 2018, entitled "Distributed Quantum Computing System." which claims priority to U.S. Provisional Application No. 62/522,039 entitled "Distributed Quantum Computing System" and filed Jun. 19, 2017, and to U.S. Provisional Application No. 62/522,537 entitled "Distributed Quantum Computing System" and filed Jun. 20, 2017. The entire contents of all above-referenced priority applications are hereby incorporated by reference.

BACKGROUND

The following description relates to a distributed quantum computing system, and in particular to handling user requests to access distributed quantum computing resources.

Quantum computers can perform computational tasks by executing quantum algorithms. Quantum algorithms are often expressed in terms of quantum logic operations applied to qubits. A variety of physical systems have been developed for quantum computing applications. Examples include superconducting circuits, trapped ions, spin systems and others.

DETAILED DESCRIPTION

Figure 1:
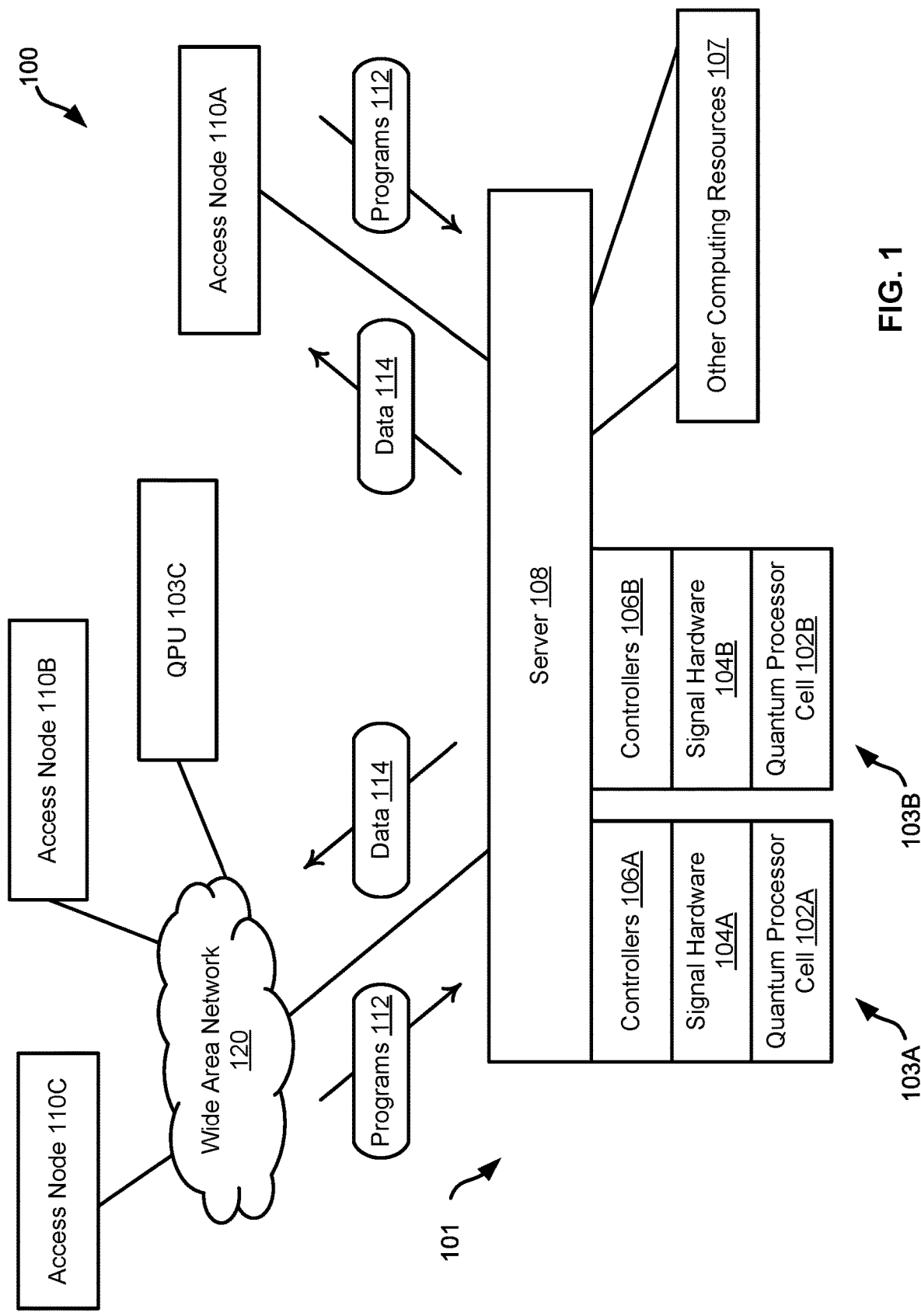
FIG. 1 is a block diagram of a computing system.

FIG. 1 is a block diagram of an example computing system. The example computing system 100 shown in FIG. 1 includes a computing environment 101 and access nodes 110A, 110B, 110C. A computing system may include additional or different features, and the components of a computing system may operate as described with respect to FIG. 1 or in another manner.

The example computing environment 101 includes computing resources and exposes their functionality to the access nodes 110A, 110B, 110C (referred to collectively as "access nodes 110"). The computing environment 101 shown in FIG. 1 includes a server 108, quantum processor units 103A, 103B and other computing resources 107. The computing environment 101 may also include one or more of the access nodes (e.g., the example access node 110A) and other features and components. A computing environment may include additional or different features, and the components of a computing environment may operate as described with respect to FIG. 1 or in another manner.

The example computing environment 101 can provide services to the access nodes 110, for example, as a cloud-based or remote-accessed computer, as a distributed computing resource, as a supercomputer or another type of high-performance computing resource, or in another manner. The computing environment 101 or the access nodes 110 may also have access to one or more remote QPUs (e.g., QPU 103C). As shown in FIG. 1, to access computing resources of the computing environment 101, the access nodes 110 send programs 112 to the server 108 and in response, the access nodes 110 receive data 114 from the server 108. The access nodes 110 may access services of the computing environment 101 in another manner, and the server 108 or other components of the computing environment 101 may expose computing resources in another manner.

Any of the access nodes 110 can operate local to, or remote from, the server 108 or other components of the computing environment 101. In the example shown in FIG. 1, the access node 110A has a local data connection to the server 108 and communicates directly with the server 108 through the local data connection. The local data connection can be implemented, for instance, as a wireless Local Area Network, an Ethernet connection, or another type of wired or wireless connection. Or in some cases, a local access node can be integrated with the server 108 or other components of the computing environment 101. Generally, the computing system 100 can include any number of local access nodes.

In the example shown in FIG. 1, the access nodes 110B, 110C and the QPU 103C each have a remote data connection to the server 108, and each communicates with the server 108 through the remote data connection. The remote data connection in FIG. 1 is provided by a wide area network 120, such as, for example, the Internet or another type of wide area communication network. In some cases, remote access nodes use another type of remote data connection (e.g., satellite-based connections, a cellular network, a private network, etc.) to access the server 108. Generally, the computing system 100 can include any number of remote access nodes.

The example server 108 shown in FIG. 1 communicates with the access nodes 110 and the computing resources in the computing environment 101. For example, the server 108 can delegate computational tasks to the quantum processor units 103A, 103B and the other computing resources 107, and the server 108 can receive the output data from the computational tasks performed by the quantum processor units 103A, 103B and the other computing resources 107. In some implementations, the server 108 includes a personal computing device, a computer cluster, one or more servers, databases, networks, or other types of classical or quantum computing equipment. The server 108 may include additional or different features, and may operate as described with respect to FIG. 1 or in another manner.

Each of the example quantum processor units 103A, 103B operates as a quantum computing resource in the computing environment 101. The other computing resources 107 may include additional quantum computing resources (e.g., quantum processor units, quantum virtual machines (QVMs) or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the server 108 generates computing jobs, identifies an appropriate computing resource (e.g., a QPU or QVM) in the computing environment 101 to execute the computing job, and sends the computing job to the identified resource for execution. For example, the server 108 may send a computing job to the quantum processor unit 103A, the quantum processor unit 103B or any of the other computing resources 107. A computing job can be formatted, for example, as a computer program, function, code or other type of computer instruction set. Each computing job includes instructions that, when executed by an appropriate computing resource, perform a computational task and generate output data based on input data. For example, a computing job can include instructions formatted for a quantum processor unit, a quantum virtual machine, a digital microprocessor, co-processor or other classical data processing apparatus, or another type of computing resource.

In some implementations, the server 108 operates as a host system for the computing environment 101. For example, the access nodes 110 may send programs 112 to server 108 for execution in the computing environment 101. The server 108 can store the programs 112 in a program queue, generate one or more computing jobs for executing the programs 112, generate a schedule for the computing jobs, allocate computing resources in the computing environment 101 according to the schedule, and delegate the computing jobs to the allocated computing resources. The server 108 can receive, from each computing resource, output data from the execution of each computing job. Based on the output data, the server 108 may generate additional computing jobs, generate data 114 that is provided back to an access node 110, or perform another type of action.

In some implementations, all or part of the computing environment 101 operates as a cloud-based quantum computing (QC) environment, and the server 108 operates as a host system for the cloud-based QC environment. For example, the programs 112 can be formatted as quantum computing programs for execution by one or more quantum processor units. The server 108 can allocate quantum computing resources (e.g., one or more QPUs, one or more quantum virtual machines, etc.) in the cloud-based QC environment according to the schedule, and delegate quantum computing jobs to the allocated quantum computing resources for execution.

In some implementations, all or part of the computing environment 101 operates as a hybrid computing environment, and the server 108 operates as a host system for the hybrid environment. For example, the programs 112 can be formatted as hybrid computing programs, which include instructions for execution by one or more quantum processor units and instructions that can be executed by another type of computing resource. The server 108 can allocate quantum computing resources (e.g., one or more QPUs, one or more quantum virtual machines, etc.) and other computing resources in the hybrid computing environment according to the schedule, and delegate computing jobs to the allocated computing resources for execution. The other (non-quantum) computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the server 108 can select the type of computing resource (e.g., quantum or otherwise) to execute an individual computing job in the computing environment 101. For example, the server 108 may select a particular quantum processor unit (QPU) or other computing resource based on availability of the resource, speed of the resource, information or state capacity of the resource, a performance metric (e.g., process fidelity) of the resource, or based on a combination of these and other factors. In some cases, the server 108 can perform load balancing, resource testing and calibration, and other types of operations to improve or optimize computing performance.

The example server 108 shown in FIG. 1 may include a quantum machine instruction library or other resources that the server 108 uses to produce quantum computing jobs to be executed by quantum computing resources in the computing environment 101 (e.g., by the quantum processor unit 103). The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by the programs 112. For instance, the server 108 or the computing environment 101 can expose the quantum machine instruction library to the access nodes 110 through a set of application programming interfaces (APIs). Accordingly, the programs 112 that are produced by the access nodes 110 and delivered to the server 108 may include information that invokes a quantum machine instruction library stored at the server 108. In some implementations, one or more of the access nodes 110 includes a local version of a quantum machine instruction library. Accordingly, the programs 112 that are produced by the access node 110B and delivered to the server 108 may include instruction sets from a quantum machine instruction library.

Each of the example quantum processor units 103A, 103B shown in FIG. 1 can perform quantum computational tasks by executing quantum machine instructions. In some implementations, a quantum processor unit can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum processor unit (e.g., QPU 103A or QPU 103B) can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, a quantum processor unit (e.g., QPU 103A or QPU 103B) can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation, or other computational regimes may be used. Pairs of qubits can be addressed, for example, with two-qubit logic operations that are capable of generating entanglement, independent of other pairs of qubits. In some implementations, more than two qubits can be addressed, for example, with multi-qubit quantum logic operations capable of generating multi-qubit entanglement. In some implementations, the quantum processor unit 103A is constructed and operated according to a scalable quantum computing architecture. For example, in some cases, the architecture can be scaled to a large number of qubits to achieve large-scale general purpose coherent quantum computing.

The example quantum processor unit 103A shown in FIG. 1 includes controllers 106A, signal hardware 104A, and a quantum processor cell 102A; similarly the example quantum processor unit 103B shown in FIG. 1 includes controllers 106B, signal hardware 104B, and a quantum processor cell 102B. A quantum processor unit may include additional or different features, and the components of a quantum processor unit may operate as described with respect to FIG. 1 or in another manner.

In some instances, all or part of the quantum processor cell 102A functions as a quantum processor, a quantum memory, or another type of subsystem. In some examples, the quantum processor cell 102A includes a quantum circuit system. The quantum circuit system may include qubit devices, resonator devices and possibly other devices that are used to store and process quantum information. In some cases, the quantum processor cell 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102A. In some cases, the quantum processor cell 102A includes an ion trap system, and the qubit devices are implemented as trapped ions controlled by optical signals delivered to the quantum processor cell 102A. In some cases, the quantum processor cell 102A includes a spin system, and the qubit devices are implemented as nuclear or electron spins controlled by microwave or radio-frequency signals delivered to the quantum processor cell 102A. The quantum processor cell 102A may be implemented based on another physical modality of quantum computing.

In some implementations, the example quantum processor cell 102A can process quantum information by applying control signals to the qubits in the quantum processor cell 102A. The control signals can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

The example signal hardware 104A includes components that communicate with the quantum processor cell 102A. The signal hardware 104A may include, for example, waveform generators, amplifiers, digitizers, high-frequency sources, DC sources, AC sources and other type of components. The signal hardware may include additional or different features and components. In the example shown, components of the signal hardware 104A are adapted to interact with the quantum processor cell 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processor cell 102A to operate the quantum processor unit 103A. For instance, the signal hardware 104A may generate signals to implement quantum logic operations, readout operations or other types of operations. As an example, the signal hardware 104A may include arbitrary waveform generators (AWGs) that generate electromagnetic waveforms (e.g., microwave or radio-frequency) or laser systems that generate optical waveforms. The waveforms or other types of signals generated by the signal hardware 104A can be delivered to devices in the quantum processor cell 102A to operate qubit devices, readout devices, bias devices, coupler devices or other types of components in the quantum processor cell 102A.

In some instances, the signal hardware 104A receives and processes signals from the quantum processor cell 102A. The received signals can be generated by operation of the quantum processor unit 103A. For instance, the signal hardware 104A may receive signals from the devices in the quantum processor cell 102A in response to readout or other operations performed by the quantum processor cell 102A. Signals received from the quantum processor cell 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio-frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processor cell 102A.

In some implementations, the signal hardware 104A includes signal delivery hardware that interface with the quantum processor cell 102A. For example, the signal hardware 104A may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor cell 102A. In some instances, signal delivery hardware performs preprocessing, signal conditioning or other operations on readout signals received from the quantum processor cell 102A.

The example controllers 106A communicate with the signal hardware 104A to control operation of the quantum processor unit 103A. The controllers 106A may include digital computing hardware that directly interface with components of the signal hardware 104A. The example controllers 106A may include processors, memory, clocks and other types of systems or subsystems. The processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory, a digital or quantum memory, or another type of computer storage medium. The controllers 106A may include additional or different features and components.

In some implementations, the controllers 106A include memory or other components that store quantum state information, for example, based on qubit readout operations performed by the quantum processor unit 103A. For instance, the states of one or more qubits in the quantum processor cell 102A can be measured by qubit readout operations, and the measured state information can be stored in a cache or other type of memory system in or more of the controllers 106A. In some cases, the measured state information is used in the execution of a quantum algorithm, a quantum error correction procedure, a quantum processor unit (QPU) calibration or testing procedure, or another type of quantum process.

In some implementations, the controllers 106A include memory or other components that store quantum machine instructions, for example, representing a quantum program for execution by the quantum processor unit 103A. In some cases, the quantum machine instructions are received from the server 108A in a hardware-independent format. For example, quantum machine instructions may be provided in a quantum instruction language such as Quil, described in the publication "A Practical Quantum Instruction Set Architecture," arXiv:1608.03355v2, dated Feb. 17, 2017, or another quantum instruction language. For instance, the quantum machine instructions may be written in a format that can be executed by broad range of quantum processor units or quantum virtual machines.

In some instances, the controllers 106A can interpret the quantum machine instructions and generate a hardware-specific control sequences configured to execute the operations proscribed by the quantum machine instructions. For example, the controllers 106A may generate control information that is delivered to the signal hardware 104A and converted to control signals that control the quantum processor cell 102A.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some cases, the controllers 106A schedule control operations according to quantum machine instructions in a quantum computing program, and the control information is delivered to the signal hardware 104A according to the schedule in response to clock signals from a clock or other timing system.

In some implementations, the controllers 106A include processors or other components that execute computer program instructions (e.g., instructions formatted as software, firmware, or otherwise). For example, the controllers 106A may execute a quantum processor unit (QPU) driver software, which may include machine code compiled from any type of programming language (e.g., Python, C++, etc.) or instructions in another format. In some cases, QPU driver software receives quantum machine instructions (e.g., based on information from the server 108) and quantum state information (e.g., based on information from the signal hardware 104A), and generates control sequences for the quantum processor unit 103A based on the quantum machine instructions and quantum state information.

In some instances, the controllers 106A generate control information (e.g., a digital waveform) that is delivered to the signal hardware 104A and converted to control signals (e.g., analog waveforms) for delivery to the quantum processor cell 102A. The digital control information can be generated based on quantum machine instructions, for example, to execute quantum logic operations, readout operations, or other types of control.

In some instances, the controllers 106A extract qubit state information from qubit readout signals, for example, to identify the quantum states of qubits in the quantum processor cell 102A or for other purposes. For example, the controllers may receive the qubit readout signals (e.g., in the form of analog waveforms) from the signal hardware 104A, digitize the qubit readout signals, and extract qubit state information from the digitized signals.

The other QPU 103B and its components (e.g., the quantum processor cell 102B, the signal hardware 104B and controllers 106B) can be implemented, and in some instances operate, as described above with respect to the QPU 103A; in some cases, the QPU 103B and its components may be implemented or may operate in another manner. Similarly, the remote QPU 103C and its components can be implemented, and in some instances operate, in analogous manner.

Figure 2:
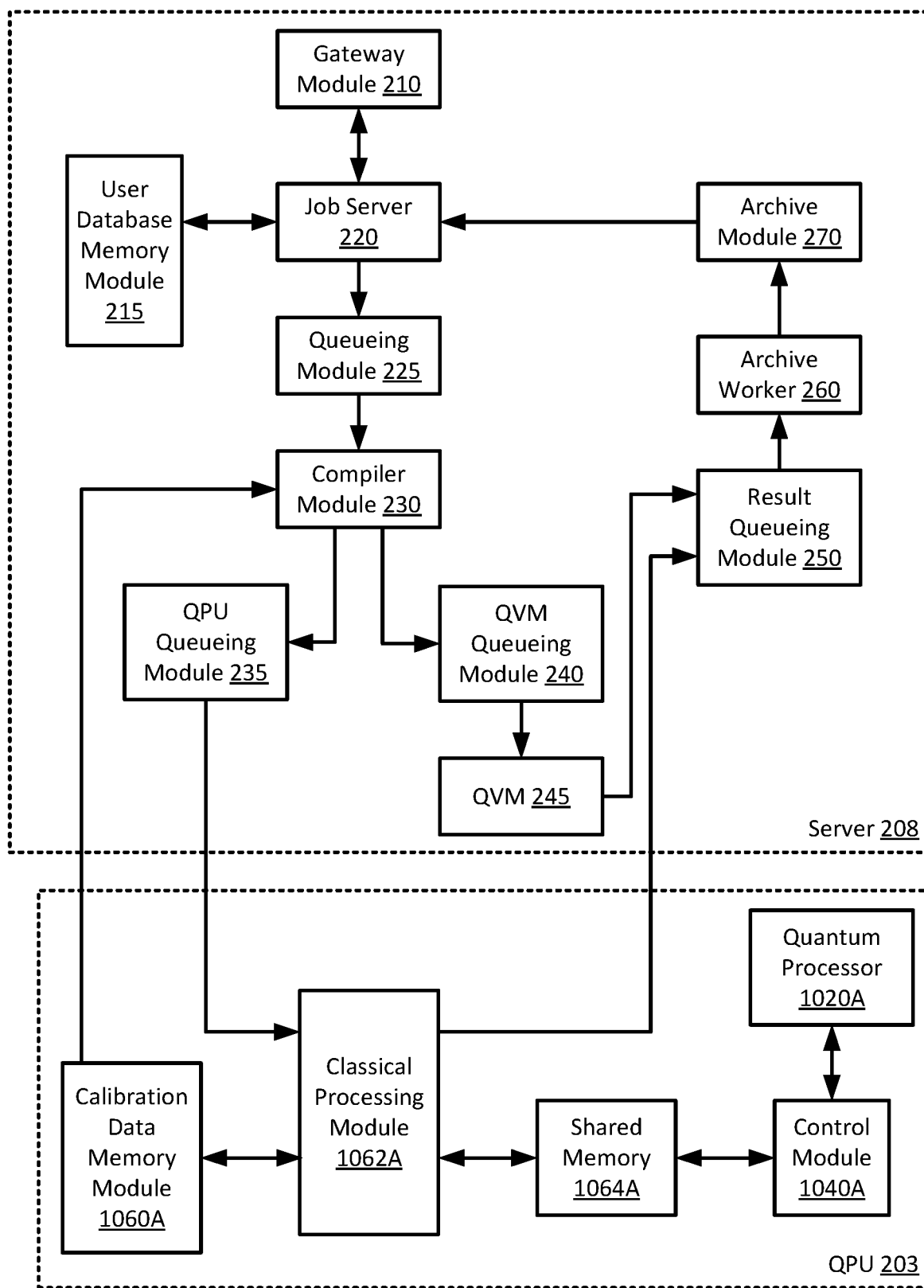
FIGS. 2-2A are block diagrams of another example computing system.

FIG. 2 is a block diagram of example computing system 200. Example computing system 200 comprises an example server 208 and one or more example QPUs 203. Example server 208 may be, e.g. server 108 described in FIG. 1. The one or more example QPUs 203 may be, e.g. a QPU 103A, 103B, 103C described in FIG. 1. Server 208 manages job requests from one or more users that wish to access a QPU 203. Server 208 includes a gateway module 210, a user database memory module 215, a job server 220, a queueing module 225, a compiler module 230, a QPU queueing module 235, a quantum virtual machine (QVM) queueing module 240, a QVM 245, a result queueing module 250, an archive worker 260, and an archive module 270. Example server 208 and example QPU 203 may include additional or different features, and the components of server 208 and QPU 203 may operate as described with respect to FIG. 2 or in another manner. The modules of server 208 may be software modules stored in a memory, e.g. a computer-readable storage medium. The software modules may comprise computer instructions which may be executed by one or more processors of server 208.

Gateway module 210 is configured with an interface for receiving asynchronous job requests from multiple local or remote users, e.g. an access nodes 110, via a corresponding local or remote connections over a network, as described for computing system 100 described in FIG. 1. In some cases, the user requests are requests for access to quantum computing resources. In an implementation, users that submit job requests may be disparate and may have different goals when submitting a job request. After submitting a job request, a user does not have to remain connected. For example, the user may establish a temporary connection to gateway module 210 via the interface to submit a new job request, or request status or results of a previously requested job, and may disconnect after completing the request. A job request may include a user id. In some cases, the user request may include an indication of what resource the user is requesting to use, e.g. QVM or QPU. The job request may also include a program received from the user, e.g. programs 112 described in FIG. 1. In some cases, the program may be a compiled program. In other cases, the program may be an uncompiled computer program. For example, a user may submit a job request to have the uncompiled computer program executed. In some cases, the program may be in a quantum instruction language, such as Quil. The gateway module 210 may provide a first level of user authorization when a job request is received from a user. In an implementation, the interface of gateway module 210 may be an application programming interface (API). For example, the API may receive job requests via the Hypertext Transfer Protocol (HTTP). In some cases, the API interface requires an API key for access by a user. Gateway module 210 may reject a job request is it fails authentication at the interface. If the user is authenticated, gateway module 210 forwards the job request to job server 220.

In some implementations, a user may query gateway module 210 for status of a previously submitted job request. For example, a user may inquire if a particular job has completed. A job identifier (also referred to as a job id) may be assigned by job server 220, as described below, and provided back to gateway module 210 to be used as a reference for the job request. In some cases, the gateway module 210 provides the job id to the user which may be used by the user as a reference number to check on the status of the job. When the user receives the job id from gateway module 210, it may release the connection to the gateway module. Later, the user may make status inquiry of the job request to gateway module 210 and include the job id in the status inquiry. Gateway module 210 may forward the status inquiry to the job server 220 for processing.

Job server 220 is connected to gateway module 210 and receives the job request from gateway module 210. In some implementations, job server 220 authenticates the user, receives the program from the user request, and in some cases, individualizes the user request based on the user. Job server 220 is also connected to a memory module comprising a user database 215. In some cases, job server 220 accesses user database 215 to verify the user's credentials. In some cases, this may be a primary authorization of the user or may be secondary to an authorization performed by gateway module 210. On authorization of the user, job server 220 may assign a job id to the job request. In some cases, job server 220 may provide the assigned job id to gateway module 210, and gateway module 210 may provide the job id to the user associated with the job request. In an example, the gateway module 210 may use the assigned job id to process queries from the user regarding a requested job, e.g. in order to provide status and/or results to the user. In some cases, job server 220 may store the incoming job request from the user in user database 215. The job server 220 may also store the assigned job id associated with the job request in database 215. In an implementation, the job server 220 pushes the program to queueing module 225. In some instances, job server 220 may push relevant user information with the program to queueing module 225. Relevant user information may include user preferences and permissions associated with the requested quantum computing resource, e.g. QPU 203 or QVM 245. In one implementation, a user may have a preference, e.g. a user's choice, of using QPU 203 or QVM 245 for running a job. In some cases, the user may not have a preference in which case, job server 220 may select either QPU 203 or QVM 245 for processing the user's job request. The user's choice may be indicated in the job request or stored in database 215 and retrieved by job server 220 while processing a job request. Relevant user information may also include user permissions, such as, permissions associated with a user's subscription, permissions for running a job on a QPU 203 or QVM 245, permissions providing access to a particular sized qubit array of QPU 203 or QVM 245, particular run time limits for the user, computer memory limits of the user, a dedicated time window for the user, etc. In some cases, the relevant user information is stored in user database 215 and obtained by job server 220 on a per job request basis. For example, job server 220 may retrieve user information from user database 215 using the user id received in the user request. In cases in which job server 220 makes selections for a particular user's job request, job server 220 may update the user database 215 and/or the job request with the selections. In some cases, before forwarding the job request for processing, job server 220 may determine on which quantum computing resources the job should be executed, e.g. QPU 203 or QVM 245. This information, if applicable, as well as other relevant user information is associated with the job request. The job server 220 pushes the program to a queue, e.g. queueing module 225, for further processing.

Figure 2A:
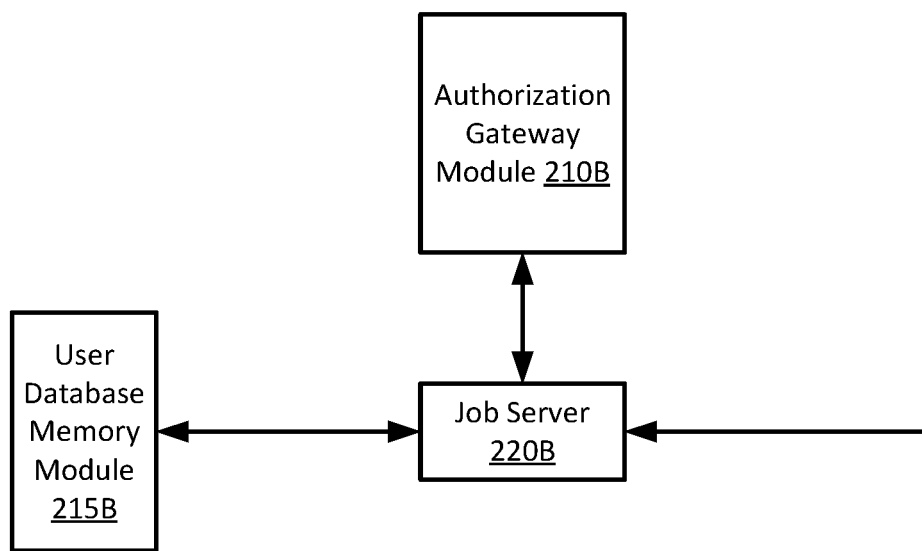

FIG. 2B illustrates an alternative configuration that includes an authorization gateway module 210B, user database 215B and job server 220B. In this configuration, the functionality is similar to that as described for FIG. 2A, except the authorization gateway module 210B is connected to the user database 215B rather than the job server 220B being connected to the user database. In this implementation, the authorization gateway module 210B accesses user database 215B to verify the user's credentials and to perform authorization of the user. The authorization gateway module 210B may also obtain relevant user information, such as the information described above, from user database 215B. In that case, authorization gateway module 210B provides the job request and relevant user information to the job server 220B, and job server 220B pushes the program and, in some cases, relevant user information to a queue, e.g. queueing module 225.

Queueing module 225 is connected to the job server 220. In an implementation, queueing module 225 receives the program, via the connection, from job server 220 on authentication of the user. In an example, job server 220 pushes the program to queueing module 225, and program is queued in the queueing module 225 to await compilation. In some cases, relevant user information associated with the job request is also pushed by the job server 220 with the program at queueing module 225. The term "push" is used throughout to describe a process by which information, e.g. a program, output data, user information, etc., is sent, provided, and/or written to a queue. The term "pull" is used throughout to describe a process by which information, e.g. a program, output data, user information, etc. is retrieved, obtained, and/or read from a queue. A polling process may be performed to first check if any information is in the queue before performing a pull operation.

Compiler module 230 is connected to the queueing module 225. In some implementations, compiler module 230 may communicate with the queueing module 225 via the connection, e.g. to make queries and/or to retrieve programs awaiting compilation. In an implementation, compiler module 230 pulls a program, which in some cases includes the relevant user information associated with the program, from queueing module 225. In some cases, compiler module 230 polls the queueing module 225 to determine if a program has been queued before retrieving, e.g pulling, the program. After pulling the program, compiler module 230 compiles the uncompiled program into a schedule of instructions. The schedule of instructions may be native control instructions. In some implementations, compiler module 230 compiles for a certain QPU 103 or QVM 245. In some cases, when the program is uncompiled, the program is compiled according to the relevant user information, e.g. user's choice of QPU 103 or QVM 245. In some cases, the compiler module 230 is connected to a calibration data memory module 1060A in the QPU 103. In some cases, compiler module 230 pulls calibration information specific to a quantum processor 1020A from the calibration database on the memory module 1060A, and the calibration data may be used in program compilation. In this instance, calibration of the QPU is handled as a job in the queue, rather than, for instance, shutting the system down for calibration. In some cases, the program may already be compiled, and thus, the compiler module does not need to generate a schedule of instructions. In that case, the compiler skips the compilation process.

In some instances, the compiler module 230 directs the schedule of instructions to one of the QPU 103 and the QVM 245 based on a user's request for processing on the QPU 203 or QVM 245. In some cases, the user's request for processing is received with the program. In other cases, the compiler module 230 directs the schedule of instructions to one of the QPU 203 and the QVM 245 according to other instruction or criteria. For example, the compiler module 230 may direct the schedule of instructions based on a determination of a run-time of the schedule of instructions on the QPU 203 and the QVM 245. In some cases, the compiler module 230 may direct the schedule of instructions to either the QPU 203 or the QVM 245 depending on which has the shorter run time for the schedule of instructions. In other cases, the compiler may send the schedule of instructions to both the QPU 203 and the QVM 245. The compiler module 230 directs the schedule of instructions to the QPU 203 and/or QVM 245 by pushing the schedule of instructions to a queue corresponding to the QPU 203 and/or a queue corresponding to the QPU 203.

Compiler module 230, as described above, directs the schedule of instructions according to whether the program is to be executed on the QPU 203 or QVM 245, or in some cases, both, e.g. based on the user's request as described above. A QPU queueing module 235 is connected to the compiler module 230. In some implementations, compiler module 230 pushes the schedule of instructions to the QPU queueing module 235, and the schedule of instructions from the compiler module 230 are stored in the QPU queueing module 235, e.g. as an entry in the queue. In some cases, a QVM queueing module 240 is connected to the compiler module 230. In one example, compiler module 230 pushes the schedule of instructions to the QVM queueing module 240, and the schedule of instructions from the compiler module 230 are stored in the QVM queueing module 240, e.g. as an entry in the queue. The schedule of instructions will remain in the QPU queueing module 235 until the QPU pulls the job for execution. Similarly, the schedule of instructions will remain in the QVM queueing module 240 until the QVM pulls the job for execution. In some implementations, each QPU 203 may have a distinct QPU queuing module 235. In some cases, the QPU queueing module 235 and/or the QVM queueing module may receive a poll request polling the queue for programs awaiting execution.

In an implementation, QPU 203 pulls the schedule of instructions from QPU queueing module 235 and executes the schedule of instructions. In some cases, QPU 203 polls the QPU queueing module 235 to determine if a program has been queued for execution before retrieving, e.g pulling, the program. In some instances, after execution of the program, QPU 203 pushes output data to a result queuing module 250 via a connection between QPU 203 and result queuing module 250 on server 208. In another implementation, QVM 245 pulls the schedule of instructions from the QVM queueing module 240 and executes the schedule of instructions. In some cases, QVM 245 polls the QVM queueing module 240 to determine if a program has been queued for execution before retrieving, e.g pulling, the program. An example of a QVM is described in "A Practical Quantum Instruction Set Architecture" R. S. Smith et al., available at https://arxiv.org/pdf/1608.03355.pdf. QVM 245 pushes output data to the result queuing module 250 via a connection between QVM 245 and result queuing module 250, both on server 208. As shown in FIG. 2, in certain implementations, the result queueing module 250 may be connected to QPU 203, to QVM 245 in server 208, or to both.

Output data pushed to the results queueing module 250 from a QPU 203 and/or QVM 245 is stored in the results queueing module 250 until pulled by an archive worker 260 that is connected to the result queuing module 250. For example, the archive worker 260 pulls output data, which includes execution results, from the result queuing module 250 and stores the output data at archive module 270. In some cases, the archive worker 260 may poll the result queueing module 250 to check if output data for a program is available before pulling the output data. Archive module 270 is connected to the job server 220. Job server 220 pulls the output data from archive module 270 and, in some cases, makes the output data available to an authenticated user via gateway module 210. For example, job server 220 receives a request from a user, via the interface of gateway module 210, for the results of a particular job id. On authentication of the job id and/or the user, job server 220 pulls the output data from archive module 270, and provides the output data associated with the job id to the user through the gateway module 210 in FIG. 2B or the authorization gateway module 210B in FIG. 2B. In some cases, job server 220 may poll archive module 270 to check if output data for the job id and/or the user is available before pulling the output data from archive module 270.

In an implementation, QPU 203 is connected to server 208, as in FIG. 2. In some cases, QPU 203 of computer system 200 includes: a calibration data memory module 1060A, a classical processing module 1062A, a control module 1040A, a quantum processor 1020A, and in some cases, a shared memory 1064A. For example, the calibration data memory module 1060A, classical processing module 1062A, and shared memory 1064A may be, or included in, controllers 106A of QPU 103 described in FIG. 1. Also, control module 1040A may be, or included in, signal hardware 104A, and quantum processor 1020A may be, or included in, a quantum processor cell 102A of QPU 103 also described in FIG. 1. In some examples, a quantum processor 1020A may comprise a processor that may be one or more of a trapped ion quantum processor, a quantum gate array processor and a superconducting-material based quantum processor.

As shown in FIG. 2, classical processing module 1062A is connected to server 208 and is also be connected to calibration data memory module module 1060A in QPU 203. In an implementation, classical processing module 1062A pulls a schedule of instructions from QPU queueing module 235 and pulls calibration information specific to quantum processor 1020A from memory module 1060A. Classical processing module 1062A is also connected to control module 1040A. For each event in the schedule of instructions pulled from QPU queueing module 235, classical processing module 1062A generates control signals derived from the schedule of instructions and the calibration information. The control signals are executed on the quantum processor 1020A by the control module 1040A. The control module 1040A returns results from executing the control signals on the quantum processor 1020A to classical processing module 1062A.

In some cases, QPU 203 may be configured for asynchronous quantum/classical computation. In this instance, QPU 203 includes a shared memory module 1064A connected to the classical processing module 1062A and the control module 1040A. In asynchronous quantum/classical computation, classical processing module 1062A, or a sub-module thereof, handles the classical part of the computation. For some of these circuit devices, and computing regimes described herein, having the shared memory physically close to the quantum processor, and also in some cases, close to the classical processing module allows optimum performance of the system. For example, classical processing module 1062A is connected to the control module 1040A via shared memory 1064A. In this case, the control signals generated by classical processing module 1062A may be stored in shared memory 1064A, and retrieved by control module 1040 for execution on quantum processor 1020A. In some cases, the control module 1040A returns results from execution of the control signals on quantum processor 1020A to the classical processing module 1062A via shared memory 1064A. In an implementation, classical processing unit 1062A of QPU 203 is connected to the result queueing module 250 on the server. Classical processing unit 1062A pushes output data, that includes execution results, from QPU 203 onto the result queueing module 250 via the connection. In other cases, QPU 203 may be configured for hybrid quantum/classical computation. In that scenario, QPU 203 includes a shared memory module connected to the classical processing module 1062A and the control module 1040A, and the classical process module 1062A performs the classical part of the computation, as described above.

Figure 3A:
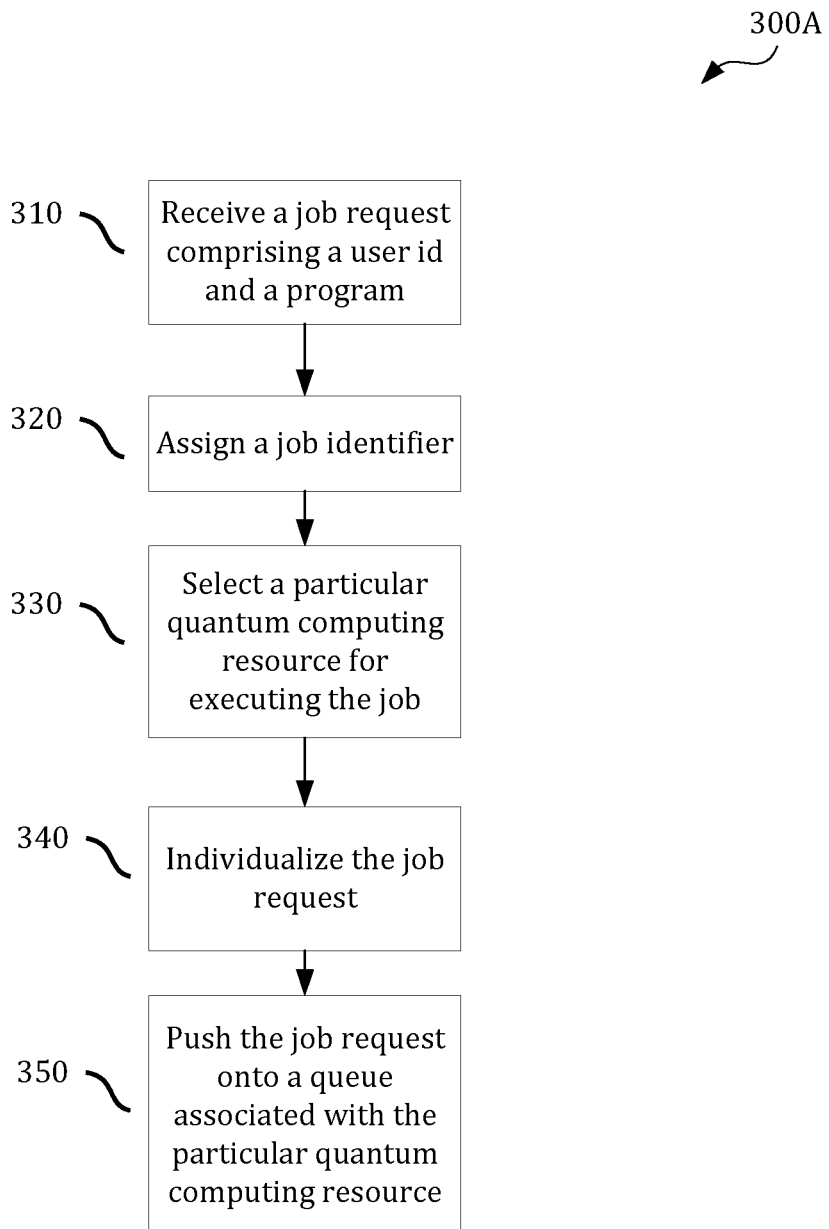
FIGS. 3A-3B are flow diagrams of a method performed by the example computing system.
Figure 3B:
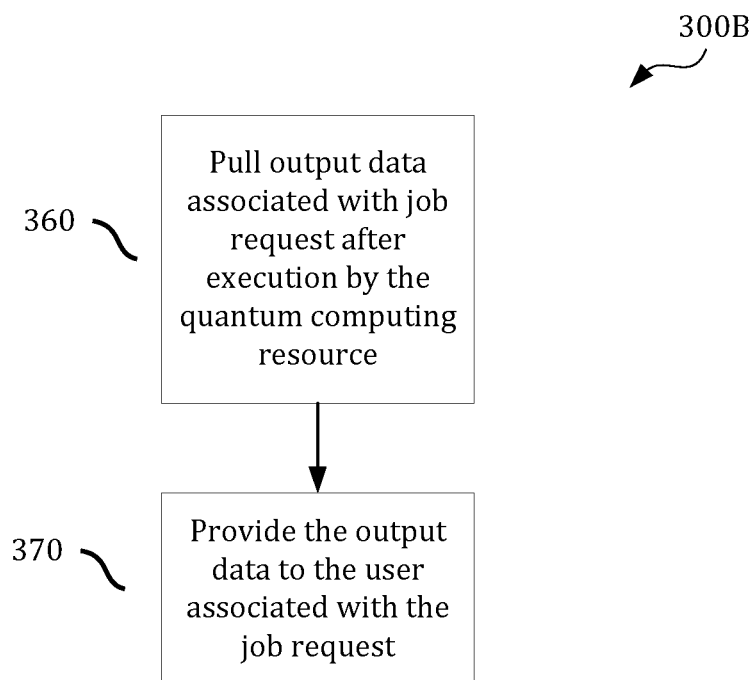

FIGS. 3A-3B are a flow diagrams showing example processes 300A, 300B of operating a computer system. The example processes 300A, 300B can be performed, for example, by a computer system that receives and handles job requests from users that do not have access to quantum computing resources. For instance, operations in the processes 300A, 300B may be performed by the server 208 in the example communication system 200 shown in FIG. 2, or in another type of communication system. The example processes 300A, 300B may exchange information with other processes performed by server 208 or by a quantum computing processor, e.g. QPU 203. The example processes 300A, 300B may include additional or different operations, and the operations may be performed in the order shown or in another order. In some cases, one or more of the operations shown in FIGS. 3A-3B are implemented as processes that include multiple operations, sub-processes or other types of routines. In some cases, operations can be combined, performed in parallel, iterated or otherwise repeated or performed in another manner. In some examples, the processes 300A, 300B are performed by job server 220 of server 208 which receives and handles job requests from multiple users that do not have access to quantum computers or other quantum resources.

At 310 of process 300A in FIG. 3A, a job request for accessing a quantum computing resource is received. The job request may comprise a user id and a program, e.g. program 112. A quantum computing resource may be a QPU, e.g. QPU 203, or a QVM 245. In some cases, the job request is received from a remote user at a gateway interface, e.g. gateway module 210. Additional job requests may be received asynchronously at the gateway interface from multiple users.

On authorization of a user associated with the job request, the job request is processed. The user may be authenticated based on data in a memory module that includes a user database, e.g. user database 215. At 320, a job identifier is assigned to the job request.

At 330, a particular quantum computing resource is selected for the job request. In some cases, a particular quantum computing resource for the job request is selected based on a user preference. In some cases, the user preference may be a preference for execution of the job on a quantum processing unit (QPU) or a preference for execution of the job on a quantum virtual machine (QVM). In some cases, the user may indicate no preference, or may not indicate a preference, at all. In some instances, the user preference is retrieved from the user database. In other instances, the user preference is received in the job request.

At 340, the job request is individualized based on user permissions. In some cases, user permissions may include one or more of the following: permissions associated with a user's subscription, permissions for running a job on a particular quantum computing resource by the user, permissions providing access to a particular sized qubit array of the quantum computing resources for the user, run time limits of the user, computer memory limits of the user, and a dedicated time window for the user.

At 350, the job request is pushed onto a queue to be processed by the quantum computing resource. The queued job request contains the user information needed by a compiler, e.g. compiler module, to compile an uncompiled program for execution on the quantum computing resource.

FIG. 3B illustrates process 300B performed, which in one example, may be performed by job server 220, after execution of the program by the quantum computing resource. At 360, output data associated with job request is pulled after execution by the quantum computing resource. In one implementation, output data from execution of the program is received, e.g. pushed, from the quantum computing resource at a result queue. The output data is pulled from the result queue, e.g. by archive worker 260 of server 208, and stored in archive memory, e.g. archive module 270. The output data is pulled, e.g. by job server 220, from the archive memory by job server 220.

At 370, the output data is provided to the user associated with the job request. In an aspect, the job server is able to associate the output data with the job request based on the user id assigned, by the job server 220, when the job request was initially received. The output data may be provided to the user associated with the job request in response to a user query for job status and/or results.

Figure 4:
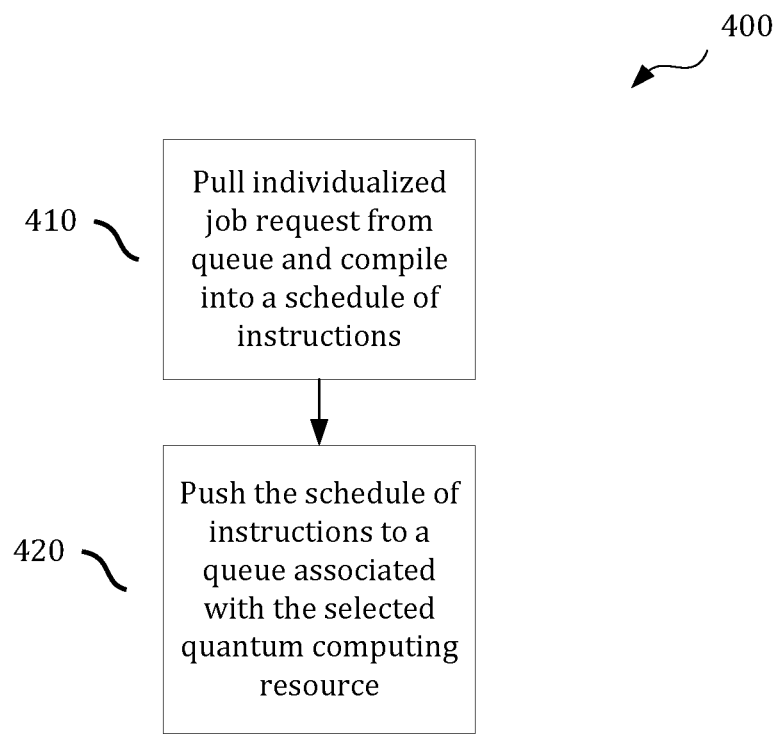
FIG. 4 is a flow diagram of an alternative method performed by the example computing system.

FIG. 4 is a flow diagram of process 400, which may be performed by a compiler, e.g. compiler module 230 of server 208 on an uncompiled program. At 410, the individualized job request is pulled, by the compiler, from the queue and the program in the job request is compiled into a schedule of instructions according to the selected quantum computing resource. In some instances, calibration data is obtained from a calibration database stored at a QPU, e.g. QPU 203, and the calibration data is used in program compilation.

At 420, the compiler pushes the schedule of instructions to a queue associated with the quantum computing resource that was selected, e.g. QPU queueing module 235 or QVM queueing module 240. In an implementation, the compiler pushes the schedule of instructions to a queue based on which quantum computing resource has the shorter run time for the schedule of instructions. In other instances, the compiler pushes the schedule of instructions to a quantum processing unit (QPU) queue, to a quantum virtual machine (QVM) queue, or to both a QPU queue and a QVM queue. The schedule of instructions may be stored as an entry in the associated queue when received, e.g. pushed, from the compiler. The queue may provide the schedule of instructions to the quantum computing resource associated with the queue. For example, the quantum computing resource pulls the schedule of instructions from the queue associated with the quantum computing resource, and executes the schedule of instructions. For example, QPU 203 pulls a schedule of instructions from QPU queueing module 235, whereas QVM 245 pulls a schedule of instructions from QVM queueing module 240. In an implementation, the schedule of instructions are pulled from the queue to be processed for execution by a QPU, e.g. QPU 203. The QPU generates control signals for execution on the QPU. The control signals are derived from the schedule of instructions and calibration information. The results from execution of the control signals on the QPU are returned to a result queue, e.g. result queueing module 250 on server 208.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus, e.g. server 208. The subject matter described in this specification may be implemented using various types of codes, languages, and systems. A computer storage medium can be, or can be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

Some of the operations described in this specification can be implemented as operations performed by a data processing apparatus, e.g. server 208, on data stored on one or more computer-readable storage devices or received from other sources.

The term "data-processing apparatus" encompasses all kinds of apparatus, devices, and machines for processing data, including by way of example a quantum processor, a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, quantum processors, general and special purpose microprocessors, and processors of any kind of digital computer. Elements of a computer can include a processor that performs actions in accordance with instructions, and one or more memory devices that store the instructions and data. Moreover, Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described, user requests to access distributed a quantum computing resource are managed.

In a first example, a job request for accessing a quantum computing resource is received by a server. The job request includes a user id and a program. On authentication of a user associated with the job request, by operation of one or more processors, a job identifier is assigned to the job request, and a particular quantum computing resource is selected for the job request. The job request is individualized based on user permissions, and pushed onto a queue to be processed for execution by the quantum computing resource.

In some implementations, a computer-readable storage medium stores computer instructions which, when executed by one or more processors, cause a server to perform one or more operations of the first example.

In a second example, a server comprises one or more processors and a memory comprising instruction which may be executed by the one or more processors. The server receives a job request for accessing a quantum computing resource. The job request includes a user id and a program. On authentication of a user associated with the job request, a job identifier is assigned to the job request and a particular quantum computing resource is selected for the job request. The job request is individualized based on user permissions, and pushed onto a queue to be processed for execution by the quantum computing resource.

Implementations of the first or second example may include one or more of the following features. Output data associated with the job request is pulled after execution by the quantum computing resource and provided to the user associated with the job request. The quantum computing resource may be a QPU or a QVM. a particular quantum computing resource for the job request may be selected based on a user preference, including a preference for execution of the job on a quantum processing unit (QPU), a preference for execution of the job on a quantum virtual machine (QVM), or no preference. User permissions may include one or more of permissions associated with a user's subscription, permissions for running a job on a particular quantum computing resource by the user, permissions providing access to a particular sized qubit array of the quantum computing resources for the user, run time limits of the user, computer memory limits fa of the user, and a dedicated time window for the user. The job request is received from a remote user at a gateway interface, and additional job requests for multiple users are received asynchronously at the gateway interface. The compiler pulls the individualized job request from the queue and compiles the program in the job request into a schedule of instructions according to the selected quantum computing resource, pushes the schedule of instructions to a queue associated with the quantum computing resource, and the queue provides the schedule of instructions to the quantum computing resource associated with the queue. The user request is retrieved from the user database. The user request is received in the job request. The schedule of instructions is pushed to a queue based on which quantum computing resource has the shorter run time for the schedule of instructions, to a QPU queue, to a QVM queue, or to both a QPU queue and a QVM queue. Calibration data from a calibration database stored at a quantum processor unit (QPU) is obtained and used in program compilation. The schedule of instructions is pulled from the queue associated with the quantum computing resource and executed by the quantum computing resource. The schedule of instructions are pulled from the queue to be processed for execution by a QPU, the QPU generates control signals for execution on the QPU, the control signals derived from the schedule of instructions and calibration information, and returns results from execution of the control signals on the QPU to a result queue. Pulling output data associated with the job request includes receiving output data from execution of the program at the quantum computing resource at a result queue, pulling the output data from the result queue and storing the output data in an archive memory, and pulling the output data from the archive memory. The user is authenticated based on data in a memory module that comprises a user database.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub combination.

In a first embodiment, a computing system includes a server and a quantum processing unit. The server comprises:

a gateway module for receiving a program from a user at a remote interface, the program being an uncompiled computer program, a job server connected to the gateway module and a user database memory module connected to the job server for authenticating the user and receiving the program, a queueing module connected to the job server for receiving the program on authentication of the user and queueing the program, a compiler module connected to the queueing module for pulling the program from the queueing module and compiling the program into a schedule of instructions, a quantum processing unit queueing module connected to the compiler module for receiving the schedule of instructions from the compiler module and storing the schedule of instructions, and a result queue module.

The quantum processing unit comprises a classical processing module connected to the server for pulling the schedule of instructions from the quantum processing unit queueing module, a memory module, the classical processing module being connected to the memory module for pulling calibration information specific to the quantum processor from a database on the memory module, a quantum processor, and a control module, the classical processing module being connected to the control module of the quantum processor and the classical processing module being configured for each event in the schedule of instructions to generate control signals for execution on the quantum processor by the control module, wherein the control signals are derived by the classical processing module from the schedule of instructions and the calibration information, the control module returning results from execution of the control signals on the quantum processor to the classical processing module.

wherein the classical processing unit is connected to the result queue module on the server for pushing output data from the quantum processing unit onto the result queue module, the output data comprising the results, and wherein the server further comprises an archive worker for pulling the output data from the result queue module and storing the output data in an archive module, and wherein the job server is configured to pull the output data from the archive module and make output from the execution of the program available to the authenticated user through the gateway module.

Implementations of the first embodiment may include one or more of the following features. In one embodiment, at least part of the server is in the Cloud. The gateway module comprises an application programming interface (API). The program is in a quantum instruction language. The quantum instruction language is Quil. The compiler module is connected to the memory module for pulling calibration information specific to the quantum processor from the database on the memory unit. The quantum processor comprises an array of qubits. The quantum processor comprises a processor characterized as one or more of: a trapped ion quantum processor, a quantum gate array processor and a superconducting-material based quantum processor. The quantum processing unit is configured for asynchronous quantum/classical computation, the quantum processing unit comprising a classical computation module and a shared memory module, the classical computation module being connected to the classical processing module and the shared memory being connected to the classical computation module and the control module. The classical computation module and the shared memory module are in close physical proximity to the control module and the quantum processor. The quantum processing unit is configured for hybrid quantum/classical computation, the quantum processing unit comprising a classical computation module and a shared memory module, the classical computation module being connected to the classical processing module and the shared memory being connected to the classical computation module and the control module.

In a second embodiment, a computing system comprises a server and a quantum processing unit. The server comprises:

a gateway module for receiving a program from a user at a remote interface, the program being an uncompiled computer program, a job server connected to the gateway module and a user database memory module connected to the job server for authenticating the user and receiving the program, a queueing module connected to the job server for receiving the program on authentication of the user and queueing the program, a compiler module connected to the queueing module for pulling the program from the queueing module and compiling the program into a schedule of instructions, a quantum processing unit queueing module connected to the compiler module for receiving the schedule of instructions from the compiler module and storing the schedule of instructions, a quantum virtual machine queueing module connected to the compiler module for receiving the schedule of instructions from the compiler module and storing the schedule of instructions, a quantum virtual machine module for pulling the schedule of instructions from the quantum virtual machine queueing module and executing the schedule of instructions, a result queue module, wherein the quantum virtual machine module is connected to the result queue module for pushing output data from the quantum virtual machine module onto the result queue module.

The quantum processing unit comprises:

a classical processing module connected to the server for pulling the schedule of instructions from the quantum processing unit queueing module, a memory module, the classical processing module being connected to the memory module for pulling calibration information specific to the quantum processor from a database on the memory module, a quantum processor, and a control module, the classical processing module being connected to the control module of the quantum processor and the classical processing module being configured for each event in the schedule of instructions to generate control signals for execution on the quantum processor by the control module, wherein the control signals are derived by the classical processing module from the schedule of instructions and the calibration information, the control module returning results from execution of the control signals on the quantum processor to the classical processing module, wherein the classical processing unit is connected to the result queue module on the server for pushing output data from the quantum processing unit onto the result queue module, the output data comprising the results, and wherein the server further comprises an archive worker for pulling the output data from the result queue module and storing the output data in an archive module, wherein the job server is configured to pull the output data from the archive module and make output from the execution of the program available to the authenticated user through the gateway module.

Implementations of the second embodiment may include one or more of the following features. In one embodiment, at least part of the server is in the Cloud. The gateway module comprises an application programming interface (API). The compiler module directs the schedule of instructions to one of the QPU and the QVM based on a user request for processing on one of the QPU and the QVM. The user request is received with the program. The user request is retrieved from a user database. The compiler module is configured to direct the schedule of instructions to one of the QPU and the QVM based on a determination by the compiler module of run time of the schedule of instructions on the QPU and the QVM, the compiler module being configured to direct the schedule of instructions to the one of the QPU and the QVM with shortest run time for the schedule of instructions. The program is in a quantum instruction language. The quantum instruction language is Quil. The compiler module is connected to the memory module for pulling calibration information specific to the quantum processor from the database on the memory unit. The quantum processor comprises an array of qubits. The quantum processor comprises a processor characterized as one or more of: a trapped ion quantum processor, a quantum gate array processor and a superconducting-material based quantum processor. The quantum processing unit is configured for asynchronous quantum/classical computation, the quantum processing unit comprising a classical computation module and a shared memory module, the classical computation module being connected to the classical processing module and the shared memory being connected to the classical computation module and the control module. The classical computation module and the shared memory module are in close physical proximity to the control module and the quantum processor. The quantum processing unit is configured for hybrid quantum/classical computation, the quantum processing unit comprising a classical computation module and a shared memory module, the classical computation module being connected to the classical processing module and the shared memory being connected to the classical computation module and the control module.

In a third embodiment, a method of operating a computer system comprises:

receiving a program at a gateway module from a user at a remote interface, the program being an uncompiled computer program, authenticating the user and receiving the program at a job server connected to the gateway module, a user database memory module being connected to the job server for providing authenticating data on the user, receiving the program on authentication of the user and queueing the program on a queueing module connected to the job server, pulling the program from the queueing module and compiling the program into a schedule of instructions at a compiler module connected to the queueing module, receiving the schedule of instructions from the compiler module and storing the schedule of instructions in a quantum processing unit queueing module connected to the compiler module, pulling the schedule of instructions from the quantum processing unit queueing module by a classical processing module, pulling calibration information specific to the quantum processor from a database on a memory module connected to the classical processing module, for each event in the schedule of instructions, generating by the classical processing module control signals for execution on the quantum processor by the control module, wherein the control signals are derived by the classical processing module from the schedule of instructions and the calibration information, the control module returning results from execution of the control signals on the quantum processor to the classical processing module, wherein the classical processing unit is connected to the result queueing module on the server for pushing output data from the quantum processing unit onto the result queueing module, the output data comprising the results, wherein an archive worker pulls the output data from the result queue module and stores the output data in an archive module, and wherein the job server is configured to pull the output data from the archive module and make output from the execution of the program available to the authenticated user through the gateway module.

In a fourth embodiment, method of operating a computer system comprises:

receiving a program at a gateway module from a user at a remote interface, the program being an uncompiled computer program, authenticating the user and receiving the program at a job server connected to the gateway module, a user database memory module being connected to the job server for providing authenticating data on the user, receiving the program on authentication of the user and queueing the program on a queueing module connected to the job server, pulling the program from the queueing module and compiling the program into a schedule of instructions at a compiler module connected to the queueing module, directing the schedule of instructions to one of the QPU and the QVM based on a user request for processing on one of the QPU and the QVM or based on a determination by the compiler module of run time of the schedule of instructions on the QPU and the QVM, the compiler module being configured to direct the schedule of instructions to the one of the QPU and the QVM with shortest run time for the schedule of instructions.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of a server comprising:
    receiving a job request for accessing a quantum computing resource comprising a quantum processing unit (QPU) configured for quantum-classical computation, the job request comprising a user id and a computer program comprising a computer instruction set, wherein the computer program is an uncompiled computer program, and wherein the QPU comprises a quantum processor for running quantum parts of a computation, a control module for operating the quantum processor, a classical processing module for running classical parts of the computation, and a shared memory connected to the control module and the classical processing module; and
    on authentication of a user associated with the job request, by operation of one or more processors:
        selecting a particular quantum computing resource for the job request;
        individualizing the job request based on user permissions;
        storing the job request in a first queue to be processed for execution by the selected particular quantum computing resource;
        causing a compiler to compile the computer program in the job request from the first queue into a schedule of instructions according to the selected particular quantum computing resource;
        storing the schedule of instructions to a second queue associated with the selected particular quantum computing resource; and
        providing, by the second queue associated with the selected particular quantum computing resource, the schedule of instructions to the selected particular quantum computing resource for execution by the selected particular quantum computing resource.

2. The method of claim 1, wherein the quantum computing resource comprises:
    a quantum virtual machine (QVM).

3. The method of claim 2, wherein selecting the particular quantum computing resource for the job request is based on a user preference, the user preference comprising:
    execution of the job request on the QPU;
    and on the QVM.

4. The method of claim 1, wherein the user permissions comprise one or more of:
    permissions associated with a user's subscription;
    permissions for running a job on a particular quantum computing resource by the user;
    permissions providing access to a particular sized qubit array of the quantum computing resources for the user;
    run time limits of the user;
    computer memory limits of the user; and
    a dedicated time window for the user.

5. The method of claim 1, wherein the job request is received from a remote user at a gateway interface, and
    additional job requests for multiple users are received asynchronously at the gateway interface.

6. The method of claim 1, wherein storing the schedule of instructions to the second queue associated with the selected particular quantum computing resources comprises:
storing the schedule of instructions to the second queue based on which quantum computing resource has the shortest run time for the schedule of instructions.

7. The method of claim 1, further comprising,
obtaining calibration data specific to the QPU from a calibration database stored at the QPU; and
using the calibration data in program compilation, wherein the calibration data is collected by running a calibration routine on the QPU, the calibration routine being a job in a queue associated with the QPU.

8. The method of claim 1, wherein the schedule of instructions is pulled from the second queue to be processed for execution by the QPU, and
wherein the QPU generates control signals for execution on the QPU, the control signals derived from the schedule of instructions and calibration information; and
returning results from execution of the control signals on the QPU to a result queue.

9. A server comprising:
one or more processors;
a memory storing computer instructions, which when executed by the one or more processors, cause the server to:
receive a job request for accessing a quantum computing resource comprising a quantum processing unit (QPU) configured for quantum-classical computation, the job request comprising a user id and a computer program comprising a computer instruction set, wherein the computer program is an uncompiled computer program, and wherein the QPU comprises a quantum processor for running quantum parts of a computation, a control module for operating the quantum processor, a classical processing module for running classical parts of the computation, and a shared memory connected to the control module and the classical processing module; and
on authentication of a user associated with the job request:
select a particular quantum computing resource for the job request;
individualize the job request based on user permissions; and
store the job request in a first queue to be processed for execution by the selected particular quantum computing resource;
cause a compiler to compile the computer program in the job request from the first queue into a schedule of instructions according to the selected particular quantum computing resource;
store the schedule of instructions to a second queue associated with the selected particular quantum computing resource; and
provide, by the second queue associated with the selected particular quantum computing resource, the schedule of instructions to the selected particular quantum computing resource for execution by the selected particular quantum computing resource.

10. The server of claim 9, wherein the quantum computing resource comprises:
a quantum virtual machine (QVM).

11. The server of claim 10, wherein selecting the particular quantum computing resource for the job request is based on a user preference, the user preference comprising:
execution of the job request on the QPU;
and on the QVM.

12. The server of claim 9, wherein the user permissions comprise one or more of:
permissions associated with a user's subscription;
permissions for running a job on a particular quantum computing resource by the user;
permissions providing access to a particular sized qubit array of the quantum computing resources for the user;
run time limits of the user;
computer memory limits of the user; and
a dedicated time window for the user.

13. The server of claim 9, wherein the job request is received from a remote user at a gateway interface, and
additional job requests for multiple users are received asynchronously at the gateway interface.

14. The server of claim 9, wherein the instructions, which when executed by the one or more processors, cause the server to store pushing the schedule of instructions to the second queue associated with the selected particular quantum computing resources based on being configured to cause the one or more processors to
store the schedule of instructions to the second queue based on which quantum computing resource has the shortest run time for the schedule of instructions.

15. The server of claim 9, further comprising,
obtaining calibration data specific to the QPU from a calibration database stored at the QPU; and
using the calibration data in program compilation, wherein the calibration data is collected by running a calibration routine on the QPU, the calibration routine being a job in a queue associated with the QPU.

16. A non-transitory computer-readable storage medium comprising computer instructions which, when executed by one or more processors, cause a server to:
receive a job request for accessing a quantum computing resource comprising a quantum processing unit (QPU) configured for quantum-classical computation, the job request comprising a user id and a computer program comprising a computer instruction set, wherein the computer program is an uncompiled computer program, and wherein the QPU comprises a quantum processor for running quantum parts of a computation, a control module for operating the quantum processor, a classical processing module for running classical parts of the computation, and a shared memory connected to the control module and the classical processing module; and
on authentication of a user associated with the job request:
select a particular quantum computing resource for the job request;
individualize the job request based on user permissions; and
store the job request in a first queue to be processed for execution by the selected particular quantum computing resource;
cause a compiler to compile the computer program in the job request from the first queue into a schedule of instructions according to the selected particular quantum computing resource;
store the schedule of instructions to a second queue associated with the selected particular quantum computing resource; and provide, by the second queue associated with the selected particular quantum computing resource, the schedule of instructions to the selected particular quantum computing resource for execution by the selected particular quantum computing resource.

17. The non-transitory computer-readable storage medium of claim 16, wherein the quantum computing resource comprises a quantum virtual machine (QVM).

18. The non-transitory computer-readable storage medium of claim 17, wherein selecting the particular quantum computing resource for the job request is based on a user preference, the user preference comprising:
   execution of the job request on the QPU and on the QVM.

19. The non-transitory computer-readable storage medium of claim 18, wherein the user preference is retrieved from a user database.

20. The non-transitory computer-readable storage medium of claim 16, wherein the user permissions comprise one or more of:
   permissions associated with a user's subscription;
   permissions for running a job on a particular quantum computing resource by the user;
   permissions providing access to a particular sized qubit array of the quantum computing resources for the user;
   run time limits of the user;
   computer memory limits of the user; and
   a dedicated time window for the user.

* * * * *